(12) United States Patent
Perrollaz

(10) Patent No.: US 9,157,454 B2
(45) Date of Patent: Oct. 13, 2015

(54) FLOW STRAIGHTENER DEVICE FOR TURBOMACHINE

(75) Inventor: Jean Marc Claude Perrollaz, Héricy (FR)

(73) Assignee: SNECMA, Paris (FR)

( * ) Notice: Subject to any disclaimer, the term of this patent is extended or adjusted under 35 U.S.C. 154(b) by 502 days.

(21) Appl. No.: 13/640,820

(22) PCT Filed: Apr. 4, 2011

(86) PCT No.: PCT/FR2011/050749
§ 371 (c)(1),
(2), (4) Date: Oct. 12, 2012

(87) PCT Pub. No.: WO2011/128551
PCT Pub. Date: Oct. 20, 2011

(65) Prior Publication Data
US 2013/0028726 A1 Jan. 31, 2013

(30) Foreign Application Priority Data

Apr. 14, 2010 (FR) ...................................... 10 52857

(51) Int. Cl.
| | |
|---|---|
| F01D 9/02 | (2006.01) |
| F04D 29/54 | (2006.01) |
| F01D 9/04 | (2006.01) |
| F04D 29/64 | (2006.01) |

(52) U.S. Cl.
CPC .............. *F04D 29/542* (2013.01); *F01D 9/042* (2013.01); *F04D 29/644* (2013.01); *Y02T 50/672* (2013.01); *Y02T 50/673* (2013.01); *Y10T 29/49229* (2015.01)

(58) Field of Classification Search
CPC ........ F01D 9/042; F01D 9/047; F01D 25/246
USPC ............ 415/209.2–209.4; 416/214 A, 214 R, 416/220 R
See application file for complete search history.

(56) References Cited

U.S. PATENT DOCUMENTS 4,594,761 A * 6/1986 Murphy et al. ............ 29/889.71
7,959,408 B2 * 6/2011 Belmonte .................. 415/209.3

(Continued)

FOREIGN PATENT DOCUMENTS

| EP | 1 908 923 A1 | 4/2008 |
|---|---|---|
| FR | 2 636 378 | 3/1990 |
| FR | 2 846 997 | 5/2004 |

OTHER PUBLICATIONS

International Search Report as issued for PCT/FR2011/050749.

*Primary Examiner* — Nathanial Wiehe
*Assistant Examiner* — Woody A Lee, Jr.
(74) *Attorney, Agent, or Firm* — Pillsbury Winthrop Shaw Pittman LLP

(57) ABSTRACT

A flow straightener device for a turbomachine including an inner shell ring and an outer shell ring surrounding the inner shell ring, at least one out of the inner shell ring and outer shell ring having first orifices; at least two flow straightener vanes each including, at least at one same first end, an attachment platform having second orifices positioned facing the first orifices; the at least two vanes being assembled with at least one of the inner shell ring and outer shell ring by at least one first device of attachment introduced into the first orifices and the second orifices. The flow straightener device includes a covering platform covering the at least one first device of attachment.

12 Claims, 3 Drawing Sheets

(56) References Cited

U.S. PATENT DOCUMENTS

| | | |
|---|---|---|
| 2010/0080692 A1* | 4/2010 | Tudor et al. .................... 415/139 |
| 2010/0196149 A1* | 8/2010 | Beaulieu ..................... 415/182.1 |
| 2011/0033286 A1* | 2/2011 | Vauchel ...................... 415/182.1 |
| 2011/0073745 A1* | 3/2011 | Duchatelle et al. ........... 248/637 |
| 2012/0027604 A1* | 2/2012 | McDonald et al. ........ 416/219 R |
| 2012/0148388 A1* | 6/2012 | Bottome ..................... 415/170.1 |
| 2013/0287562 A1* | 10/2013 | Ishigure et al. ............. 415/208.1 |
| 2014/0093355 A1* | 4/2014 | Hyatt et al. .................... 415/108 |
| 2015/0064000 A1* | 3/2015 | Yagi et al. ................... 415/209.3 |

* cited by examiner

FLOW STRAIGHTENER DEVICE FOR TURBOMACHINE

CROSS REFERENCE TO RELATED APPLICATIONS

This application is the U.S. National Stage of PCT/FR2011/050749, filed Apr. 4, 2011, which in turn claims priority to French Patent Application No. 1052857, filed Apr. 14, 2010, the contents of all applications are incorporated herein by reference in their entireties.

The present invention concerns a flow straightener device for a turbomachine and more particularly for a double-flux turbojet A double-flux turbojet for aircraft propulsion generally comprises an upstream fan delivering an annular air flow. This annular air flow is divided by an annular intermediate hub into a primary flow which supplies a motor driving the fan and a secondary flow which is ejected in the atmosphere whilst providing a large proportion of the thrust of the turbojet. The fan is contained in a fan case delimiting externally the secondary flow.

Downstream of this fan, between the fan case and the intermediate hub, upstream to downstream flow straightener blades are positioned to straighten the secondary flow in the axis of the motor and structural arms permitting the intermediate hub to be integrated with the fan case.

According to an embodiment described in the document EP 1 908 923, a flow straightener blade generally comprises an attachment platform, a blade and a blade root. The fan case includes a circumferential groove, arranged in its internal wall, suited to receive the attachment platform. The latter is held in the groove by means of two screws. These attachment screws are screwed in the platform, respectively on each side of the flanks of the blade. At its lower end, the root of the blade is retained by engagement in an opening arranged in the intermediate hub.

To respect the profile of the secondary stream formed by the intermediate hub and the fan case, counterbores suited to receive the heads of the screws are realized in the attachment platform. More precisely, these counterbores permit it to be avoided that the screw heads terminate in the secondary stream. So as to reconstruct the profile of the secondary stream, the screw heads and the counterbores are covered by means of an elastomer.

A disadvantage of this type of embodiment lies in the fact that in time the elastomer becomes detached and makes room for the counterbores and also for the screw heads. Although the latter do not trespass into the secondary stream, the secondary flow is engulfed in the counterbores and creates aerodynamic disturbances.

Furthermore, a structural arm comprises at each of its ends an attachment platform comprising openings. One of its ends is integrated with the fan case and the other of its ends is integrated with the intermediate hub by screws.

In a similar manner to the flow straightener blades, to respect the profile of the secondary stream formed by the intermediate hub and the fan case, counterbores suited to receive the screw heads are realized in the attachment platforms. To reconstruct the profile of the secondary stream, the screw heads and the counterbores are covered by means of an elastomer.

In the same way as the flow straightener blades, in time the elastomer becomes detached and makes room for the counterbores and also for the screw heads. The secondary flow then becomes engulfed in the counterbores creating aerodynamic disturbances.

Moreover, the use of straighteners to straighten the secondary flow in the axis of the motor and the use of structural arms to ensure the integration of the intermediate hub with the fan case gives a great weight to the turbojet.

In this context, the invention proposes solving the abovementioned problems of the prior art. Furthermore, the invention aims to provide on the one hand a flow straightener device giving an aerodynamic profile to a stream, the aerodynamism of which remains unchanged over time, and on the other hand a turbomachine, the weight of which is reduced.

To this end, the invention concerns a flow straightener device for a turbomachine, comprising:
- an inner shell ring and an outer shell ring surrounding said inner shell ring, at least one out of said inner shell ring and outer shell ring having first orifices;
- at least two flow straightener blades each comprising, at least at one same first end, an attachment platform having second orifices positioned facing said first orifices; said at least two blades being assembled with at least one of said inner shell ring or outer shell ring by at least one first means of attachment introduced into said first orifices and said second orifices.

The said flow straightener device further comprises a covering platform covering said at least one first means of attachment.

Thanks to the covering platform, no element of the flow straightener device for a turbomachine according to the invention terminates in the flowing stream of the air flow which receives the flow straightener device. On the contrary, thanks to the invention, the profile of the stream is respected and is perfectly smooth.

Furthermore, as each blade is integrated at a first end with an inner shell ring and at a second end with an outer shell ring, the structural arms which the turbomachines of the prior art comprise are no longer necessary. The weight of the turbomachine equipped with such a device is therefore reduced. Moreover, the assembly is facilitated by the absence of structural arms.

Apart from the main characteristics which have just been mentioned in the preceding paragraph, the flow straightener device for a turbomachine according to the invention can have one or more additional characteristics, below, considered individually or according to all technically realizable combinations:
- the said covering platform comprises:
  - an upper surface forming a covering plane at the level of which air circulates;
  - a lower surface forming an attachment plane, the said attachment plane comprising at least one slot suited to cooperate with the said at least one first attachment means to ensure the retention of the said covering platform;
- the said covering platform comprises a lug situated at an upstream end of the said covering platform, the said lug being inserted in a groove which is comprised by an integral element of the said inner shell ring or of the said outer shell ring;
- a second attachment means is positioned in the said groove, the said second attachment means receiving the said lug;
- the said second attachment means has a boss;
- the said first attachment means is a screw;
- the said covering platform is of a composite material;
- the said flow straightener device comprises a plurality of blades arranged radially to the said inner shell ring and outer shell ring.

The invention also concerns a turbomachine comprising a flow straightener device according to at least one of the above embodiments.

The invention also concerns an assembly method of a flow straightener device according to one of the above-mentioned embodiments, the said assembly method comprising the following successive steps:
- positioning the said second orifices of the said attachment platforms of the said at least two blades facing the said first orifices;
- holding the said attachment platforms on at least one of the said inner shell ring or outer shell ring with the said at least one first attachment means;
- inserting the said lug of the said covering platform in the said groove of the said ring;
- integrating the said at least one first shell ring or second shell ring, the said attachment platforms and the said covering platform with the said at least one attachment means.

Furthermore, the assembly method according to the invention can comprise, prior to the said insertion step, a positioning step of the said second attachment means.

Other characteristics and advantages of the invention will clearly emerge from the description which is given thereof below, by way of indication and in no way in a restrictive manner, with reference to the annexed attached figures, in which.

For reasons of clarity, only the elements which are essential for an understanding of the invention have been shown, this being without respecting the scale, and in a diagrammatic manner. Furthermore, identical elements which are found in different figures bear the same reference numbers.

For the following description, it being understood that the air penetrates by the upstream side of the turbojet (or turbomachine) to proceed towards the downstream side of the latter, each element being designated by a reference "X", the upstream side of each element is designated by the reference "X" followed by a single apostrophe; the downstream side of each element is designated by the reference "X" followed by two apostrophes.

Figure 1:
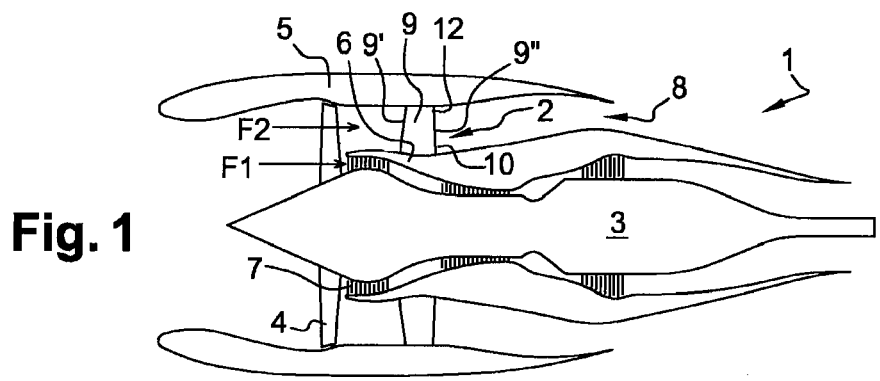
FIG. 1 shows diagrammatically a turbomachine comprising a flow straightener device according to the invention.

FIG. 1 shows diagrammatically a double flow turbojet 1. This double flow turbojet 1 comprises in particular a flow straightener device 2 according to the invention. The turbojet 1 further comprises a motor 3 at the front of which a fan 4 is placed, this motor 3 being surrounded by an outer shell ring 5 (forming a fan case in the example which is shown). An inner shell ring 6 (forming an intermediate annular hub in the example which is shown) is placed around the motor 3 and in the interior of the outer shell ring 5. In the interior of this double flow turbojet 1, the entering air flow expelled by the fan 4 is divided into a primary flow F1 which passes through a low pressure compressor 7, the blades of which are arranged between the motor 3 and the inner shell ring 6, and a secondary flow F2 which passes between the inner shell ring 6 and the outer shell ring 5. A secondary stream 8 is formed by the annular space situated between the inner shell ring 6 and the outer shell ring 5. Straightener blades 9 which the flow straightener device 2 comprises are placed between the inner shell ring 6 and the outer shell ring 5. These straightener blades 9 comprise an upstream side 9' and a downstream side 9".

In operation, the fan 4 delivers an annular air flow with a central, primary annular part, which supplies the motor 3 driving the fan 4, and an exterior, secondary annular part, which is ejected in the atmosphere, whilst supplying a large proportion of the thrust of the turbojet 1.

In accordance with the flow straightener device 2 of the invention, the straightener blade 9 comprises at a first end 10 an attachment platform 11 and at a second end 12 an attachment platform 11. Each attachment platform 11 comprises an upstream side 11' and a downstream side 11".

Figure 2:
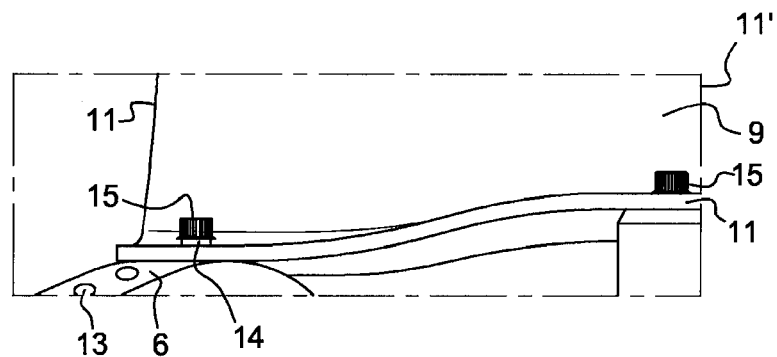
FIG. 2 shows a part of a blade which a flow straightener device according to the invention comprises.

FIG. 2 illustrates a part of a straightener blade 9, which blade 9 is attached to the inner shell ring 6. The inner shell ring 6 has a plurality of first radial orifices 13.

More particularly, the blade 9 comprises at its first end 10 the attachment platform 11. This attachment platform 11 has four second orifices 14 (only two of which are shown). According to such an embodiment, on each side of the flanks of the blade 9, the attachment platform 11 has two second orifices 14.

The second orifices 14 are positioned facing the first orifices 13, so as to be able to integrate the attachment platform 11 to the inner shell ring 6. For this purpose, first attachment means 15 are used to integrate the attachment platform 11 to the inner shell ring 6.

In our example, and for the following description, the first attachment means 15 are screws.

At its second end 12, the blade 9 also comprises an attachment platform 11 similar to that presented above, this second end 12 being integrated to the outer shell ring 5 in a similar manner.

Advantageously, an integration of the blade 9 with the inner shell ring 6 and with the outer shell ring 5 gives two functions to the flow straightener blade 9.

A first function, which is already known, consists in straightening the secondary flow, delivered by the fan 4, in the axis of the motor 3 of the turbojet 1.

A second function, which is new, consists in integrating the inner shell ring 6 to the outer shell ring 5, this function being met beforehand by structural arms.

Advantageously, according to such an embodiment, the structural arms which the turbojets of the prior art comprise are no longer necessary. The invention therefore provides turbojets 1, the weight of which is reduced.

Furthermore, since the structural arms are no longer necessary, the cost is also reduced and the assembly is facilitated.

However, the screw heads 15 overshoot attachment platforms 11 and the profile of the secondary stream 8 formed by the outer shell ring 5 and the inner shell ring 6 is modified. The screw heads 15 risk disturbing the air flow circulating in the secondary stream 8.

Figure 3:
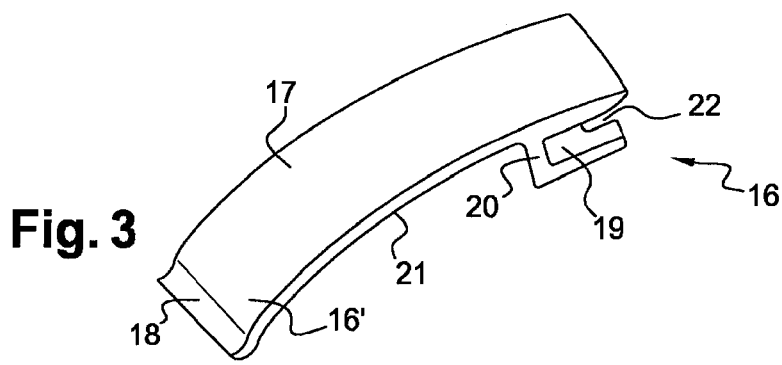
FIG. 3 illustrates a covering platform which a flow straightener device according to the invention comprises.

As shown in FIG. 3, to remedy this disadvantage, the flow straightener device 2 comprises a covering platform 16.

The covering platform 16 comprises:
- an upper surface forming a covering plane 17, the covering plane 17 having a shape adapted to follow the profile of the secondary stream 8;
- a lug 18 situated at an upstream end 16' of the covering platform 16;
- a lower surface forming an attachment plane 19 connected by a connecting arm 20 to the lower surface 21 of the covering plane 17. The attachment plane 19 comprises at least one slot 22 (only one is shown) suited to cooperate with a screw 15 to ensure the retention of the covering platform 16.

Figure 4:
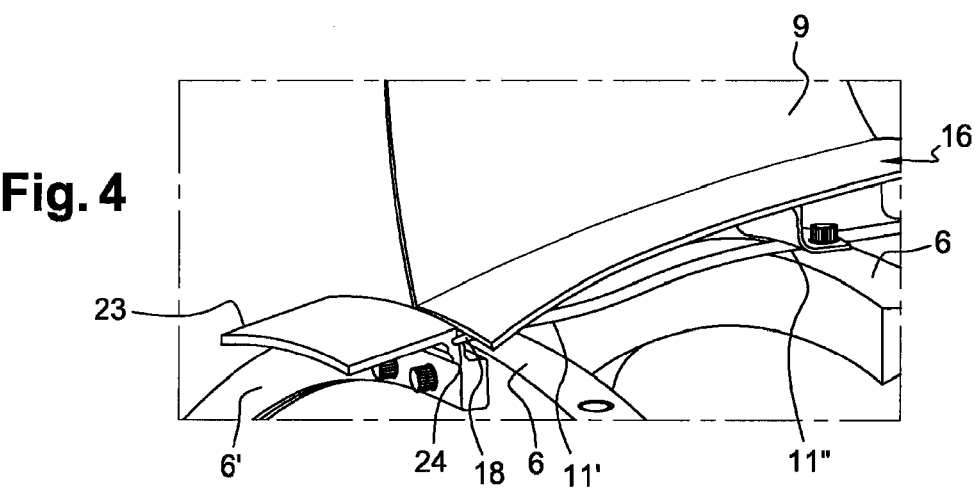
FIG. 4 shows a covering platform according to that illustrated in FIG. 3, the said covering platform being mounted on the flow straightener device according to the invention.

As illustrated in FIG. 4, the flow straightener device 2 according to the invention further comprises an element 23 integral with the inner shell ring 6 and an element 23 (not shown) integral with the outer shell ring 5. This first element 23 comprises in particular a circumferential groove suited to receive the lug 18. The element 23 is positioned at an upstream end 6' of the inner shell ring 6. An element 23 (not shown) is also positioned at an upstream end 5' of the outer shell ring 5.

Figure 5:
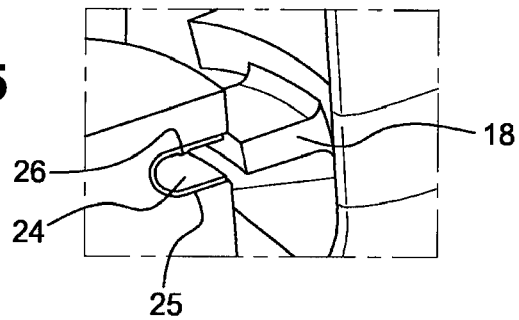
FIG. 5 illustrates the assembly of two elements of a flow straightener device according to the invention.

FIG. 5 shows the groove 24. It can be noted that a second attachment means 25 is positioned in the groove 24, the second attachment means 25 receiving the lug 18. In the example shown in FIG. 5, this second attachment means 25 is a very thin sheet of material being able to be deformed (additionally known under name of foil). The second attachment means 25 has a boss suited to deform on the insertion of the lug 18 in the groove 24 so as to eliminate the play being able to be present between the groove 24 and the lug 18.

Figure 6:
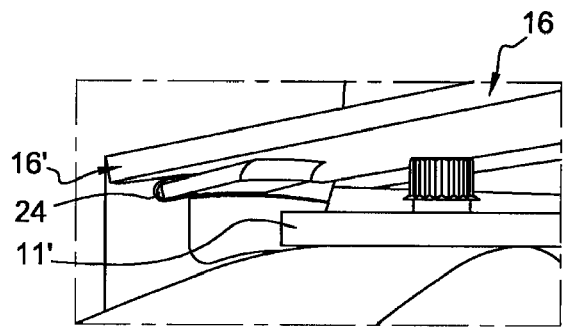
FIG. 6 shows the two elements illustrated in FIG. 5, the two elements being assembled.
Figure 7:
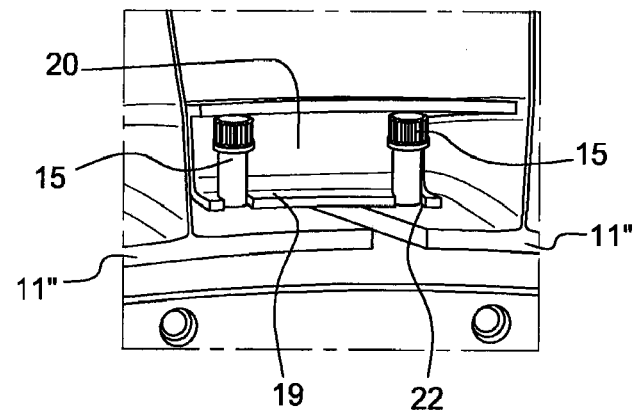
FIG. 7 illustrates the assembly of several elements of a flow straightener device according to the invention.
Figure 8:
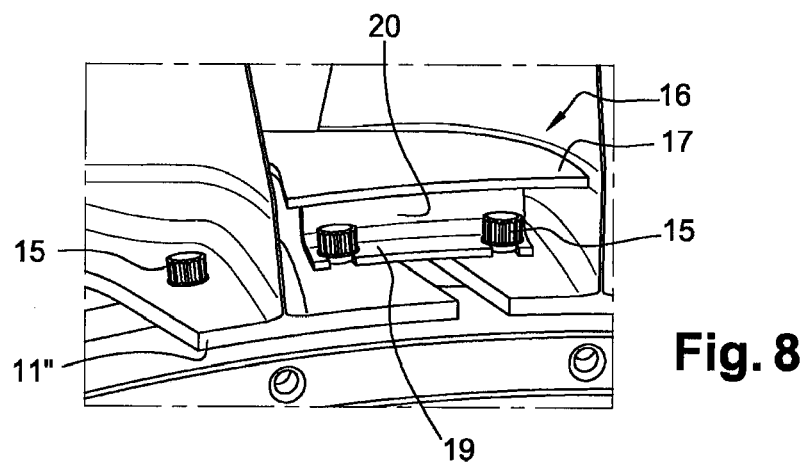
FIG. 8 shows the assembled elements illustrated in FIG. 7.
Figure 9:
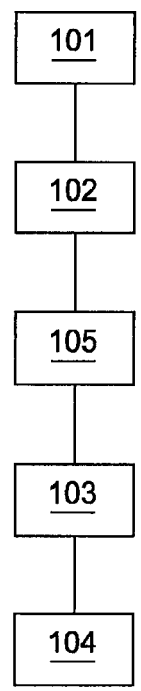
FIG. 9 illustrates diagrammatically the different steps of an assembly method of the flow straightener device according to the invention.

FIG. 6 shows the upstream end 16' of the covering platform 16, this upstream end 16' covering a screw 15. As regards FIG. 8, this shows a downstream end 16" of the covering platform 16, this downstream end 16" covering two screws 15, each of which is instrumental in the integrating of a blade 9. Each screw 15 which is positioned at the downstream end 11" of an attachment platform 11 is inserted in a slot 22 then in a second orifice 14 to be then screwed in a first orifice 13 situated facing the second orifice 14.

The flow straightener device 2 according to the invention comprises a plurality of straightener blades 9 positioned radially to the inner shell ring 6 and to the outer shell ring 5 and a plurality of covering platforms 16, each covering platform 16 being positioned between two adjacent blades 9.

Thus, once positioned, each covering platform 16 forms a part of the profile of the secondary stream 8.

The assembly method of a flow straightener device 2 according to the invention is now described in support of FIG. 9 and FIGS. 1 to 8.

To simplify the description, it will be considered that one element 23 is integral with the inner shell ring 6 and one element 23 is integral with the outer shell ring 5.

The assembly method comprises a first positioning step 101 of the second orifices 14 of the attachment platforms 11 of the blades 9 facing the first orifices 13. In the example which is shown, the second orifices 14 of each attachment platform 11 situated at the first end 10 of a blade 9 are positioned facing first orifices 13 of the inner shell ring 6. The second orifices 14 of each attachment platform 11 situated at the second end 12 of a blade 9 are positioned facing second orifices 14 of the outer shell ring 5.

A second step consists in retaining 102 the attachment platforms 11 on at least one of the inner shell ring 6 or outer shell ring 5 with at least one attachment means 15. More precisely, screws 15 are inserted in the second orifices 14 situated at the upstream end 11' of the attachment platforms 11 to be then screwed in the first orifices 12. On the other hand, the screws 15 which are to be inserted in the second orifices 14 situated at the downstream end 11" of the attachment platforms 11 will be inserted during a subsequent step.

This retention step 102 permits the integration of the upstream end 11' of the attachment platforms 11 which are:
- situated at the first ends 10 of the blades 9 at the inner shell ring 6; and
- situated at the second ends 12 of the blades 9 at the outer shell ring 5.

A third step consists in inserting 103 the lug 18 of each covering platform 16 in the groove 24 of the element 23 which is attached to the inner shell ring 6 or to the outer shell ring 5. To be inserted in a groove 24, the covering platforms 16 are tipped towards the upstream side.

A fourth step of the method consists in integrating 104 the inner shell ring 6, the attachment platforms 11 and the covering platforms 16. This integration is carried out by means of the attachment means 15. To do this, the screws 15 are positioned facing the slots 22 which the covering platform 16 comprises. These screws 15 are then inserted in the second orifices 14 then screwed in the first orifices 13. When the screws 15 are screwed in, they generate, by resting of the screw heads 15 on the attachment plane 19, a downstream tipping of the covering platform 16. When this covering platform 16 is completely tipped, the profile of the secondary stream 8 is perfectly reconstituted.

A supplementary step carried out prior to the third step of insertion 103 consists in positioning 105 the second attachment means 25 between the groove 24 and the lug 18. Thus, when the lug 18 is inserted in the groove 24, the second attachment means 25, which is formed by a deformable sheet of metal, ensures a connection of the embedding type between the groove 24 and the lug 18.

The flow straightener device according to the invention finds a particularly advantageous application in the turbomachines which aircraft engines comprise.

It is to be understood that the man skilled in the art is capable of presenting different variants of the flow straightener device according to the invention, in particular with regard to the shape of the covering platform 16 without, however, departing from the scope of the invention.

The invention claimed is:

1. A flow straightener device for a turbomachine comprising:
    - an inner shell ring and an outer shell ring surrounding said inner shell ring, said inner shell ring and said outer shell ring forming a stream, at least one of said inner shell ring or outer shell ring having first orifices;
    - at least two straightener blades each comprising at at least one first end an attachment platform having second orifices positioned facing said first orifices; said at least two blades being assembled at at least one of said inner shell ring or outer shell ring by at least one first attachment device introduced in said first orifices and said second orifices;
    - the flow straightener comprising a covering platform covering said at least one first attachment device, said covering platform comprising an upper surface forming a covering plane at the level of which air circulates; said covering plane having a shape suited to follow a profile of said stream, wherein said covering platform comprises a lower surface forming an attachment plane, said attachment plane comprising at least one slot suited to cooperate with said at least one first attachment device to ensure retention of said covering platform.

2. The flow straightener device according to claim 1, wherein said covering platform comprises a lug situated at an upstream end of said covering platform, said lug being inserted in a groove which is comprised by an element integral with said inner shell ring or said outer shell ring.

3. The flow straightener device according to claim 2, wherein a second attachment device is positioned in said groove, said second attachment device receiving said lug.

4. The flow straightener device according to claim 3, wherein said second attachment device has a boss.

5. An assembly method of a flow straightener device according to claim 2 in a turbomachine, said assembly method comprising:
   positioning said second orifices of said attachment platforms of said at least two blades facing said first orifices;
   holding said attachment platforms on at least one of said inner shell ring or outer shell ring with said at least one first attachment device;
   inserting said lug of said covering platform in said groove of said ring;
   integrating said at least one first shell ring or second shell ring, said attachment platforms and said covering platform with said at least one first attachment device.

6. The flow straightener device according to claim 1, wherein said first attachment device is a screw.

7. The flow straightener device according to claim 1, wherein said covering platform is of composite material.

8. The flow straightener device according to claim 1, comprising a plurality of blades arranged radially to said inner shell ring and outer shell ring.

9. A turbomachine, comprising a flow straightener device according to claim 1.

10. The assembly method according to claim 9, comprising, prior to said inserting, positioning a second attachment device.

11. A flow straightener device for a turbomachine that comprises an inner shell ring and an outer shell ring surrounding said inner shell ring, said inner shell ring and said outer shell ring forming a stream, at least one of said inner shell ring or outer shell ring having a first orifice; two straightener blades each comprising at at least one first end an attachment platform having a second orifice positioned facing said first orifice; said two blades being assembled at at least one of said inner shell ring or outer shell ring by a first fastener introduced in said first orifice and said second orifice, the flow straightener comprising a covering platform covering said first fastener, said covering platform comprising an upper surface forming a covering plane at the level of which air circulates during use of the turbomachine; said covering plane having a shape adapted to follow a profile of said stream, wherein said covering platform comprises a lower surface forming an attachment plane, said attachment plane comprising a slot adapted to cooperate with said first fastener to ensure retention of said covering platform.

12. The flow straightener device according to claim 11, wherein said first fastener is a screw.

* * * * *